US011345605B2

(12) United States Patent
Al-Shafei et al.

(10) Patent No.: US 11,345,605 B2
(45) Date of Patent: May 31, 2022

(54) SYSTEMS AND METHODS FOR PREPARING NANO-SIZED CRYSTALS OF BEA ZEOLITE

(71) Applicants: Saudi Arabian Oil Company, Dhahran (SA); King Fahd University of Petroleum and Minerals, Dhahran (SA)

(72) Inventors: Emad Naji Al-Shafei, Dhahran (SA); Oki Muraza, Dhahran (SA); Mohamed Ahmed, Dhahran (SA); Ki-Hyouk Choi, Dhahran (SA); Zain Hassan Yamani, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 133 days.

(21) Appl. No.: 16/684,360

(22) Filed: Nov. 14, 2019

(65) Prior Publication Data
US 2021/0147246 A1 May 20, 2021

(51) Int. Cl.
*C01B 39/46* (2006.01)
*B01J 37/04* (2006.01)
*B01J 37/03* (2006.01)
*B01J 35/02* (2006.01)
*B01J 37/08* (2006.01)

(52) U.S. Cl.
CPC ............. *C01B 39/46* (2013.01); *B01J 35/023* (2013.01); *B01J 37/031* (2013.01); *B01J 37/036* (2013.01); *B01J 37/04* (2013.01); *B01J 37/08* (2013.01); *B01J 2229/40* (2013.01); *C01P 2002/72* (2013.01); *C01P 2004/03* (2013.01); *C01P 2004/64* (2013.01)

(58) Field of Classification Search
CPC .. C01B 39/46; C01P 2004/03; C01P 2004/64; B01J 29/7007; B01J 2229/40; B01J 35/023; B01J 37/031; B01J 37/036; B01J 37/08; B01J 37/04
USPC ................... 423/700, 702, 718, 710; 502/60
See application file for complete search history.

(56) References Cited

FOREIGN PATENT DOCUMENTS

| CN | 1335258 A | 2/2002 |
|---|---|---|
| CN | 100384731 C | 4/2008 |
| CN | 101311116 A | 11/2010 |
| CN | 104556096 A | 4/2015 |
| JP | 4680515 A | 8/2005 |
| WO | 2017204268 A1 | 11/2017 |

OTHER PUBLICATIONS

Zhu et al., "Supporting Information Addressing the Viscosity Challenge: Ultrafast, Stable-Flow Synthesis of Zeolites with An Emulsion Method", React. Chem. Eng., 2018,3, 844-848 (Year: 2018).*
International Search Report and Written Opinion of PCT Application No. PCT/US2020/060383 (SA51303) dated Feb. 25, 2021: pp. 1-15.
Farag et al., "Simulation of Synthetic Zeolites-4A and 5A Manufacturing for Green Processing," IRACST—Engineering Science and Technology: An International Journal (ESTIJ), vol. 2(2), Apr. 2, 2012: pp. 188-195.
Zhu et al., "Addressing the viscosity challenge: ultrafast, stable-flow synthesis of zeolites with an emulsion method," React. Chem Eng., vol. 3(6), Oct. 3, 2018: pp. 844-848.
Zhu et al., "Supporting Information—Addressing the viscosity challenge: ultrafast, stable-flow synthesis of zeolites with an emulsion method contents," React. Chem Eng., Electronic Supplementary Material (ESI), Oct. 3, 2018: pp. 1-18.
Ding, L., et al.; Nanocrystalline zeolite beta: The effect of template agent on crystal size, ScienceDirect, Materials Research Bulletin 42 (2007), pp. 584-590.
Iwakai, K. et al.; Preparation of nano-crystalline MFI zeolite via hydrothermal synthesis in water/surfactant/organic solvent using fumed silica as the Si source; Hokkaido University Collection of Scholarly and Academic Papers; May 2011; pp. 1-31.
Kantam, M.L. et al.; Synthesis of nanocrystalline zeolite beta in supercritical fluids, characterization and catalytic activity, Journal of Molecular Catalysis A: Chemical. 252 (2006), pp. 76-84.
Lee, Yun; et al.; Nanocrystalline beta zeolite: An Efficient solid acid catalyst for the liquid-phase degradation of high-density polyethylene; Applied Catalysis B: Environmental 83 (2008) 160-167.
Shen, Y, etal; Nonionic emulsion-mediated synthesis of zeolite beta; Bull. Mater. Sci, vol. 34, No. 4.; Jul. 2011. pp. 755-758.
Tago, T. et al.; Zeolite nanocrystals—synthesis and applications; Divison of Chemical Process Engineering, Hokkaido University; Oct. 6, 2010; pp. 191-206.

(Continued)

*Primary Examiner* — Elizabeth D Wood
(74) *Attorney, Agent, or Firm* — Bracewell LLP; Constance G. Rhebergen; Eleanor L. Tyson

(57) ABSTRACT

Methods and systems for production of consistently-sized BEA zeolite nano-crystals, the method including mixing an emulsion, the emulsion comprising a surfactant and an organic solvent; heating the emulsion; mixing a zeolite solution, the zeolite solution comprising a silicon-containing compound and an aluminum-containing compound; heating the zeolite solution; adding the emulsion to the zeolite solution drop-wise over time to create an zeolite emulsion solution mixture; heating the zeolite emulsion solution mixture; and precipitating the consistently-sized BEA zeolite nano-crystals.

19 Claims, 5 Drawing Sheets

(56) References Cited

OTHER PUBLICATIONS

Tago, T., et al.; Size-Controlled Synthesis of nano-Zeolites and their Application to Light Olefin Synthesis; Hokkaido University Collection of Scholarly and Academic Papers; Sep. 2012; pp. 1-58.
Zhang, Y, et al.; Rapid Crystallization and Morphological adjustment of zeolite ZSM-5 in nonionic emulsions; Journal at Solid State Chemistry, Oct. 2011, p. 1-6.

* cited by examiner

SYSTEMS AND METHODS FOR PREPARING NANO-SIZED CRYSTALS OF BEA ZEOLITE

BACKGROUND

Field

The present disclosure relates to systems and methods for continuous production of Beta structured (BEA) zeolites. Specifically, the disclosure presents systems and methods applying emulsions with organic solvents and surfactants to produce BEA zeolites with consistent and targeted size control of the produced crystals.

Description of the Related Art

Beta structured (BEA) zeolites are used in automotive emissions control, industrial off-gas purification, volatile organic carbon (VOC) reduction, and nitrogen oxides (NOx) reduction technologies. As process catalysts, they are used for fuel upgrading, production of petrochemical intermediates, and processing chemicals. BEA zeolites are also useful for adsorption purposes, such as odor removal and active carbon replacement.

Growing demand for new catalytic chemical processing has led to a rise in the need for more reactive and selective catalysts. Nanotechnology for the production of catalytic material is essential to overcoming catalytic reaction limitations by allowing for greater dispersion of reactive catalysts, which leads to higher turnover of hydrocarbon conversion. BEA zeolite exhibits 3-D pore channels and is therefore useful to exploit shape selectivity in reactions.

BEA zeolite is used, for example, as catalyst for dewaxing and other hydrocarbon reactions such as aromatic alkylation. BEA zeolite is also used as an additive for fluid catalytic cracking (FCC) catalysts to increase olefin yield.

BEA zeolite imposes diffusion limitations for large molecules that can be reactants as well as products. In particular, cracking reactions over acidic sites on BEA zeolite accompany coke formation and deposition, which arise from "over-staying" of fragmented hydrocarbons in zeolite pore structures at elevated temperatures. Thus, the presence of controlled diffusion paths are important while maintaining surface activity. One method to control diffusion paths is to synthesize BEA zeolite nano-sized crystals.

There are several methods to produce nano-sized zeolites, for example by increasing temperature during crystal formation, controlling stirring speed, selecting appropriate template types, applying gel aging, and applying supercritical fluids. However, known systems and methods are insufficient for continuously and consistently producing characterizable nano-sized BEA zeolite crystals at desired size ranges.

SUMMARY

Applicant has recognized a need for systems and methods to continuously and consistently produce characterizable nano-sized BEA zeolite crystals at desired size ranges. Prior art technical problems include producing consistently-sized nano-sized BEA zeolite crystals and continuously producing such BEA zeolite crystals to obtain, and characterize, them at a large industrial scale. Embodiments of the present disclosure provide systems and methods using organic emulsions with surfactants to continuously and consistently produce nano-sized BEA zeolite crystals at desired size ranges. The produced nano-sized BEA zeolite crystals are characterized and can be used in oil upgrading technologies and other petrochemical applications, for example as greatly dispersible catalysts.

While other size ranges for BEA nano-sized crystals can be produced with systems and methods of the present disclosure, exemplified here are three particular size ranges in the nano scale arrived at using three different methods. By controlling silicon to aluminum ratios in silica-alumina zeolite solutions, nano-sized BEA zeolites have been continuously and consistently produced at three different crystal size ranges including about 40 nm to about 90 nm, about 80 nm to about 250 nm, and about 200 nm to about 500 nm. Certain embodiments of systems and methods apply surfactant recycling to an organic solvent to re-form an emulsion in order to obtain the consistent size results for crystal size ranges.

Consistently-sized nano-sized BEA zeolite crystals of the present disclosure, characterization of which is further discussed as follows, exhibit improved performance in hydrocarbon cracking and conversion processes. In some embodiments, separate but fluidly connected compartments are used to formulate an emulsion solution and a separate silica-alumina solution mixture. The emulsion solution, including an organic solvent and a surfactant, and silica-alumina solution mixture are allowed to react together, and then a precipitated nano-sized BEA zeolite crystal product is obtained, washed, and dried. The emulsion solution contains a surfactant, which can be recycled for further use.

The ratio of $SiO_2$ to $Al_2O_3$ was controlled and varied in different embodiments to effectively control the size range of the nano-sized BEA zeolite crystals produced. Aqueous silica-alumina solutions were prepared separately having the following molar composition 1 $SiO_2$:$yAl_2O_3$:0.037 $NaO_2$: 0.2 TEAOH:3.83 $H_2O$, where the colloidal silica used was 40 wt. % $SiO_2$ in water and where y was varied within the range of about 0.02 to 0.08 to give a molar ratio range of silicon to aluminum of about 6.25 to 25, or about 5 to 50. TEAOH is tetraethylammonium hydroxide, and sodium aluminate was used as the source of aluminum for the BEA zeolite crystals.

TEAOH and sodium aluminate are available from chemical suppliers such as Sigma-Aldrich and Acros. Other suitable TEA compounds include, but are not limited to, tetraethylammonium chloride and tetraethylammonium bromide.

Organic emulsion solutions were prepared by dissolving a surfactant, for example polyoxyethylene(15)oleyl ether or polyoxyethylene(20)oleyl ether, into a solvent such as cyclohexane or octane at about 60° C. The solvent in the organic solvent and surfactant mixture is applied at between about 5 wt. % to about 40 wt. % of the total emulsion mixture, or about 30 wt. % to about 40 wt. % of the total emulsion mixture. Other related polyoxyethylene fatty ethers derived from stearyl alcohols are suitable as surfactants for application in the synthesis of nano-sized BEA zeolites described here.

Silicon to aluminum molar ratios can be varied from about 5 to about 50, while applying a surfactant, for example polyoxyethylene(15)oleyl ether in addition to or alternative to polyoxyethylene(20)oleyl ether, which is dissolved in an organic solvent such as cyclohexane or octane to control the crystal zeolite nano sizes during formation. Nano-sized BEA zeolite crystals have been produced in three consistent size ranges within the overall size range of about 40 nm to about 500 nm, and thus targeted control has been shown using systems and methods of the present disclosure. Nano-sized BEA zeolite crystals in other size ranges could also be made applying the systems and methods disclosed here.

Thus, disclosed here is a method for production of consistently-sized BEA zeolite nano-crystals, the method including mixing an emulsion, the emulsion comprising a surfactant and an organic solvent; heating the emulsion; mixing a zeolite solution, the zeolite solution comprising a silicon-containing compound and an aluminum-containing compound; heating the zeolite solution; adding the emulsion to the zeolite solution drop-wise over time to create a zeolite emulsion solution mixture; heating the zeolite emulsion solution mixture; and precipitating the consistently-sized BEA zeolite nano-crystals. In some embodiments, the step of mixing the zeolite solution further comprises the step of controlling a ratio of the silicon-containing compound to the aluminum-containing compound, and the step of adding the emulsion to the zeolite solution comprises controlling a ratio of the emulsion to the zeolite solution to precipitate the consistently-sized BEA zeolite nano-crystals in a range between about 40 nm and about 500 nm. Still in other embodiments, the surfactant comprises at least one component selected from the group consisting of: polyoxyethylene (15)oleyl ether, polyoxyethylene(20)oleyl ether, and combinations of the same. In some embodiments, other related polyoxyethylene fatty ethers derived from stearyl alcohols are suitable as surfactants for application in the synthesis of nano-sized BEA zeolites. In certain embodiments, the organic solvent comprises at least one component selected from the group consisting of: cyclohexane, hexane, heptane, octane, dimethyl pentane, methyl hexane, methyl cyclohexane, methyl cylcopentane, and combinations of the same.

In some embodiments of the method, the organic solvent is between about 5 wt. % to about 40 wt. % of the emulsion. Still in other embodiments of the method, the step of heating the emulsion is carried out at between about 55° C. and about 70° C. In some embodiments, the step of mixing a zeolite solution comprises controlling a molar ratio of silicon to aluminum to be between about 5 to about 50. In certain embodiments, the silicon-containing compound comprises colloidal silica and the aluminum-containing compound comprises sodium aluminate. Still in other embodiments, the step of mixing the zeolite solution comprises heating the zeolite solution to between about 15° C. to about 35° C. In other embodiments, the step of adding the emulsion to the zeolite solution drop-wise comprises heating to between about 50° C. and about 75° C. Still in other certain embodiments, the step of adding the emulsion to the zeolite solution drop-wise over time occurs with emulsion addition at between about 0.01 kg/min. to about 0.1 kg/min.

In certain embodiments, after the step of adding the emulsion to the zeolite solution drop-wise over time, the total weight of the emulsion is between about 5 wt. % and about 40 wt. %, preferably between about 10 wt. % and about 30 wt. % as compared to the weight of the zeolite solution. Still in other embodiments, the step of adding the emulsion to the zeolite solution drop-wise over time includes mixing the emulsion and the zeolite solution for between about 1 hour to about 3 hours at a stirring speed between about 300 rpm to about 700 rpm and a temperature between about 50° C. to about 75° C. In certain embodiments, the step of heating the zeolite emulsion solution mixture is carried out at between about 145° C. and about 155° C. for a period of between about 68 hours and 76 hours. In certain embodiments, the step of heating the zeolite emulsion solution mixture includes the step of increasing the temperature from between about 50° C. and about 75° C. to reach about 150° C. at a heating rate of between about 1° C./min. and about 5° C./min.

Still other embodiments of the method include the step of cooling the zeolite emulsion solution mixture to between about 15° C. to about 50° C. after the step of heating the zeolite emulsion solution mixture. Certain other embodiments include the step of washing the consistently-sized BEA zeolite nano-crystals. Still other embodiments include the step of drying the consistently-sized BEA zeolite nano-crystals. Still in other embodiments the step of drying is carried out isothermally for between about 15 to about 20 hours at about 100° C. In other embodiments, the steps of separating aqueous solution, the surfactant, and the organic solvent via heating and recycling the surfactant for use in the step of mixing the emulsion are included. Still other embodiments include the step of characterizing the size range of the consistently-sized BEA zeolite nano-crystals via X-ray diffraction, scanning electron microscopy, or a combination of the same.

Additionally disclosed here is a system for carrying out the various methods, the system including a first compartment comprising a heating element and a stirring element for mixing the emulsion and heating the emulsion; a second compartment comprising a heating element and a stirring element for mixing the zeolite solution and heating the zeolite solution; and a third compartment fluidly coupled to both the first compartment and second compartment, the third compartment comprising a heating element and a stirring element and operable to add the emulsion to the zeolite solution drop-wise over time, heat the zeolite emulsion solution mixture, and precipitate the consistently-sized BEA zeolite nano-crystals.

In some embodiments the system includes a separation compartment in fluid communication with the third compartment, the separation compartment comprising a heating element and operable to separate an organic solvent, an aqueous phase, and a surfactant via heating to varying suitable temperatures for separation. Still in other embodiments, the separation compartment is operable to recycle separated surfactant to the first compartment. In certain embodiments the system includes a filter disposed between the third compartment and separation compartment to prevent the consistently-sized BEA zeolite nano-crystals from flowing from the third compartment to the separation compartment. Still in other embodiments, the first, second, third, and separation compartments each comprise at least one thermocouple for temperature control via the respective heating elements.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

So that the manner in which the features and advantages of the embodiments of systems and methods for continuously producing consistently-sized and characterizable nano-sized BEA zeolite crystals, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Figure 1:
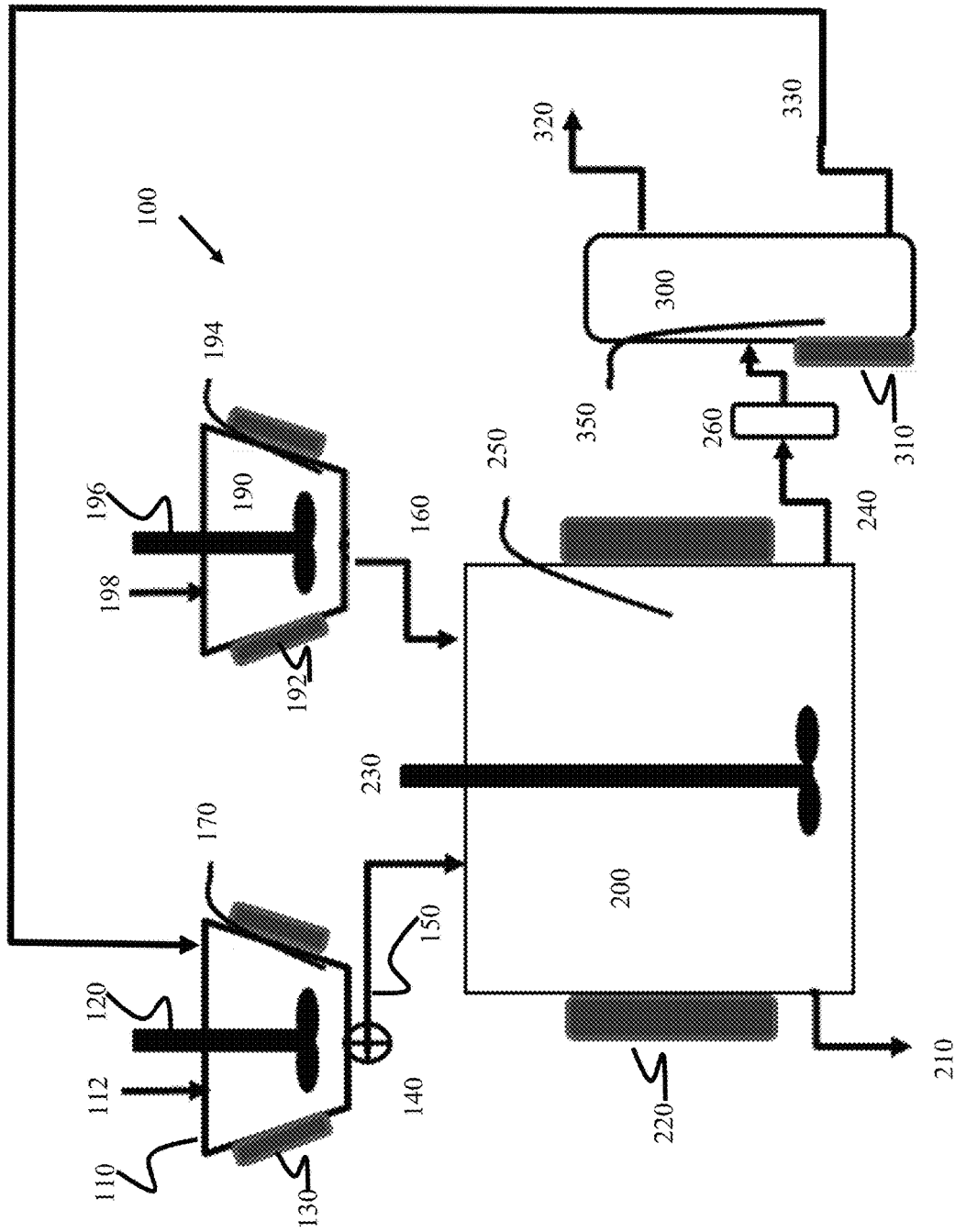
FIG. 1 is a schematic diagram showing an example system and process for continuously producing consistently-sized and characterizable nano-sized BEA zeolite crystals.

In embodiments disclosed and exemplified here, zeolite solutions generally exhibit the following molar ratios: 1 $SiO_2$:y$Al_2O_3$:0.037 $NaO_2$:0.2 TEAOH:3.83 $H_2O$, where the colloidal silica was 40 wt. % $SiO_2$ in water, and where y was varied within the range of about 0.02 to 0.08 to give a molar ratio range of silicon to aluminum of about 6.25 to 25. The molar ratio range of silicon to aluminum can also be between about 5 to about 50. Referring to FIG. 1 as certain examples are discussed, a schematic diagram is provided showing an example system and process for continuously producing consistently-sized and characterizable nano-sized BEA zeolite crystals. In nano-sized BEA zeolite production system 100, which can be run continuously or in a batch mode, an emulsion with organic solvent and surfactant is prepared with preheating in emulsion compartment 110, preferably at temperatures between about 55° C. and about 70° C.

In some embodiments, 1.867 kg of surfactant was first introduced into emulsion compartment 110 via inlet 112. Example surfactants include, but are not limited to, polyoxyethylene(15)oleyl ether in addition to or alternative to polyoxyethylene(20)oleyl ether. For example, the hydrophile-lipophile balance (HLB) number of polyoxyethylene (20)oleyl ether is 15, and one of ordinary skill in the art will understand other suitable surfactants can be used in embodiments of the disclosure. Suitable surfactants include polyethylene fatty ethers derived from stearyl alcohols, which are commercially available from suppliers such as Wako Chemicals, Sigma-Aldrich, and Acros, among others, with a purity of approx. 98%.

Stir rod 120 was operated at a speed between about 100 rpm and 300 rpm for between about 10 to about 15 minutes. Optional example organic solvents for introduction into emulsion compartment 110 include, but are not limited to, cyclohexane, hexane, heptane, octane, dimethyl pentane, methyl hexane, methyl cyclohexane, methyl cylcopentane, and combinations of the same. A solvent weight of 1.097 kg was added to the surfactant, and thus the total weight percent of solvent in the emulsion was about 37 wt. % (1.097 kg/2.964 kg). Solvent weight percent can be between about 30 wt. % to about 40 wt. % of the total emulsion, or between about 5 wt. % to about 40 wt. % of the total emulsion, in order to make the emulsion with organic solvent and surfactant. Heating elements 130 allow emulsion compartment 110 to be heated and have the temperature controlled, while thermocouple 170 is used to determine and control the temperature in the emulsion compartment 110.

After mixing and heating in emulsion compartment 110, the emulsion with organic solvent and surfactant was injected into BEA zeolite reaction compartment 200 via adjustable flow meter valve 140 and via line 150 at rate between about 0.01 kg/min. to about 0.1 kg/min. Line 150 was pre-heated at between about 50° C. and about 75° C. by controlled heating tape to maintain the heated temperature of the emulsion with surfactant and organic solvent.

In a separate zeolite mixing compartment 190, a silica-alumina zeolite solution was mixed and prepared before being injected into BEA zeolite reaction compartment 200. Zeolite mixing compartment 190 includes heating elements 192, thermocouple 194, stir rod 196, and inlet 198. In some embodiments in zeolite mixing compartment 190, 2.48 kg of colloidal silica (40 wt. % in water) was mixed with 1.6 kg of distilled water for between about 1 to about 3 hours at between about 300 rpm to about 500 rpm in order to make silica-alumina solution at a temperature between about 15° C. to about 35° C. Next, 3 kg of TEAOH (40 wt. % in water) was added to the silica-alumina solution and mixed with stir rod 196 for between about 1 to about 3 hours at between about 300 rpm to about 500 rpm at a temperature between about 15° C. to about 35° C.

In one embodiment, where the silicon to aluminum (Si/Al or Si:Al) molar ratio was about 6, 0.152 kg of sodium aluminate ($NaAlO_2$) was added to the silica and TEAOH solution and was allowed to mix for between about 1 to about 3 hours at between about 700 to about 900 rpm at a temperature between about 15° C. to about 35° C. The result was a zeolite solution to be injected into BEA zeolite reaction compartment 200 via line 160. In another embodiment, where the silicon to aluminum ratio was about 12.5, 0.304 kg of $NaAlO_2$ was added to a silica and TEAOH solution. $NaAlO_2$ is the alumina oxide source for the zeolite framework, and after calcination it is converted to $Al_2O_3$ and Na is removed. $NaAlO_2$ (sodium aluminate) can be an aluminum source in the synthesis of BEA zeolites. Therefore, the kilograms of $NaAlO_2$ added can be linear with or similar to the amount of $Al_2O_3$.

An emulsion comprising organic solvent and surfactant from emulsion compartment 110 enters BEA zeolite reaction compartment 200 via line 150, and a silica-alumina zeolite solution enters BEA zeolite reaction compartment 200 via line 160. In BEA zeolite reaction compartment 200, the temperature is preferably set between about 50° C. and about 75° C. by heating elements 220. The pre-prepared, water-based silica-alumina solution, in one embodiment at a weight of 9.832 kg, is introduced via line 160 before the emulsion with organic solvent and surfactant is injected to compartment 200 via line 150. Stir rod 230 operates at speed of about 300 rpm to about 700 rpm, preferably between about 450 rpm to about 550 rpm.

Once the pre-prepared, water-based silica-alumina solution in BEA zeolite reaction compartment 200 achieves a temperature of about 50° C. to about 75° C., the emulsion with organic solvent and surfactant is added to BEA zeolite reaction compartment 200 via line 150 at a flow rate of between about 0.01 kg/min. to about 0.1 kg/min (optionally dropwise). In at least one embodiment, a total weight of 2.964 kg of the emulsion with organic solvent and surfactant was added gradually in order to achieve about a 30% weight ratio compared to the pre-prepared, water-based silica-alumina solution (2.964 kg/9.832 kg).

Once the emulsion with organic solvent and surfactant has been completely injected into the zeolite solution, the emulsion and zeolite solution are kept mixing for between about 1 hour to about 3 hours at a stirring speed between about 300 rpm to about 700 rpm and a temperature between about 50° C. to about 75° C., preferably about 60° C. Thermocouple 250 is used to determine solution temperature in BEA zeolite reaction compartment 200. This mixing step precedes a greater-temperature hydrothermal nano-sized BEA zeolite crystal synthesis step.

In one example, for nano-sized BEA zeolite crystals in a size range of about 40 nm to about 80 nm, using a silicon to aluminum molar ratio of 6, the weight of emulsion with organic solvent and surfactant used was 2.964 kg, which is about 30% by weight compared to the weight of the zeolite solution. For nano-sized BEA zeolite crystals in a size range of about 80 nm to about 250 nm, using a silicon to aluminum molar ratio of 12.5, the weight of emulsion with organic solvent and surfactant used was 2.964 kg, which is about 30% by weight compared to the weight of the zeolite solution. For nano-sized BEA zeolite crystals in a size range of about 200 nm to about 500 nm, using a silicon to aluminum molar ratio of 12.5, the weight of emulsion with organic solvent and surfactant used was 0.999 kg, which is about 10% by weight compared to the weight of the zeolite solution.

In an example hydrothermal nano-sized BEA zeolite crystal synthesis step in BEA zeolite reaction compartment 200, lines 150, 160, 210, and 240 are isolated or closed. BEA zeolite reaction compartment 200 is heated from the mixing temperature between about 50° C. and about 75° C. to reach about 150° C. at a heating rate of between about 1° C./min. and about 5° C./min. via heating elements 220. Isothermal heating is carried out at between about 145° C. and about 155° C., preferably about 150° C., for a period of between about 68 hours and 76 hours, preferably about 72 hours. Upon completion of the hydrothermal nano-sized BEA zeolite crystal synthesis step, heating elements 220 are shut down to allow for cooling. A fan (not pictured) can be applied to speed up solution cooling to reach between about 15° C. to about 50° C. in between about 1 to about 3 hours.

Once the solution has cooled, a powdery solid of nano-sized BEA zeolite crystal is made and precipitates to the bottom of BEA zeolite reaction compartment 200, and line 240 is opened via a valve (not pictured) to evacuate solution from BEA zeolite reaction compartment 200 toward separation and recycle unit 300 without nano-sized BEA zeolite crystals passing through filter 260. Solution is evacuated via line 240 at between about 50° C. and about 75° C., and it passes through filter 260 in order to remove any zeolite solid remaining in solution. Any zeolite solid powder caught by filter 260 is returned back to BEA zeolite reaction compartment 200 for inclusion in washing and drying.

Remaining solution, including aqueous solution along with organic solvent and surfactant, proceeds to separation and recycle unit 300. For the precipitated nano-sized BEA zeolite crystals in BEA zeolite reaction compartment 200, about 10 kg to about 20 kg of distilled water is applied to wash the precipitated nano-sized BEA zeolite crystals via line 160. For washing with distilled water, stirring is applied via stir rod 230 at a speed of between about 100 rpm and about 300 rpm in order to mix water with the nano powder of BEA zeolite for between about 2 min. to about 10 min.

The precipitated nano-sized BEA zeolite crystals in BEA zeolite reaction compartment 200 were allowed to settle for about 1 to about 2 hours after washing, and the wash water was evacuated via line 210. Washing was repeated 3 times by using the same about 10 kg to about 20 kg of distilled water. The pH level of the wash water evacuated via line 210 was measured, and once the pH reached about pH 7 to about pH 7.5, water washing of the precipitated nano-sized BEA zeolite crystals was stopped. The amount of wash water and wash cycles can be scaled depending on the amount of zeolite production.

Drying was performed to remove moisture from precipitated nano-sized BEA zeolite crystals by heating via heating elements 220. Temperature of heating elements 220 was set to about 100° C., and ramping of heating elements 220 was adjusted to about 5° C./min (optionally about 3° C./min to about 7° C./min) for isothermal drying of between about 15 to about 20 hours. Line 150 and inlet 112 can be opened to release water vapor from precipitated nano-sized BEA zeolite crystals during drying.

In embodiments of the disclosure, emulsion recycling allows efficient control of the process. In separation and recycle unit 300, surfactant is recycled by evaporating water and organic solvent via line 320. Thermocouple 350 is used to determine the temperature in separation and recycle unit 300. In one example where cyclohexane is used as an organic solvent in the emulsion, heating element 310 is adjusted to between about 81° C. and about 90° C. to boil the solvent for vaporization via line 320. After complete evaporation of organic solvent, heating element 310 is used to increase the separation and recycle unit 300 temperature to between about 100° C. and about 120° C. to evaporate water from the surfactant. Once water is evaporated, separation and recycle unit 300 is allowed to cool to between about to 50° C. to about 70° C. by deactivating heating element 310 and surfactant is evacuated via line 330. Line 330 optionally includes a filter (not shown) in order to capture any remaining solid residue from separation and recycle unit 300, and the surfactant can be recycled back to compartment 110.

Precipitated nano-sized BEA zeolite crystals are collected from the bottom of BEA zeolite reaction compartment 200. The nano-sized BEA zeolite crystals are in sodium form and should be stored in a dry environment away from moisture.

Figure 2:
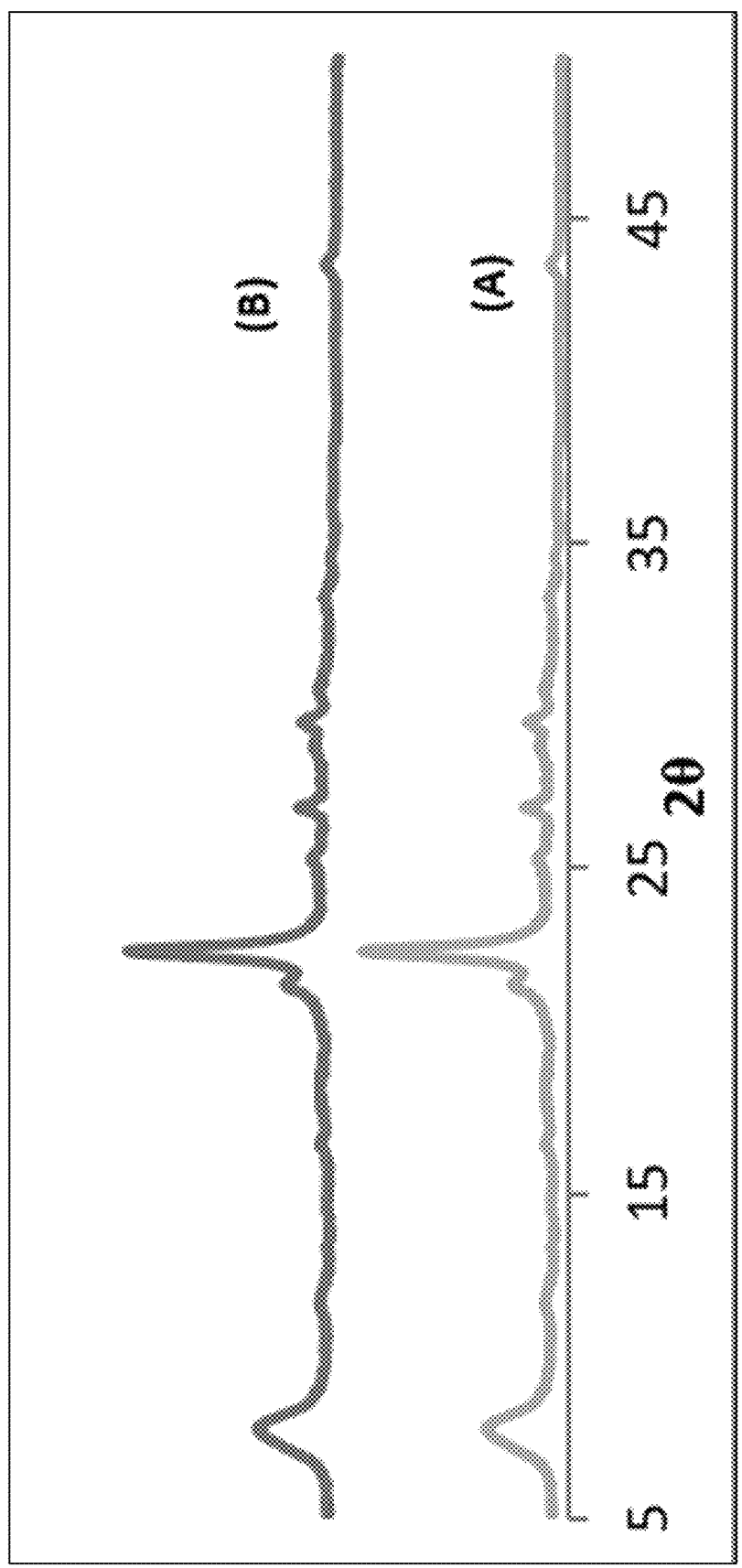
FIG. 2 is a graph showing X-ray diffraction (XRD) characterization results of two different nano-sized BEA crystals at silicon to aluminum ratios of 6 (A) and 12.5 (B).

The nano-sized BEA zeolite crystals were evaluated by using X-ray powder diffraction (XRD) on a Miniflex Rigaku diffractometer. The diffractometer applied Cu Kα radiation of (1.5405 Å). The analysis was performed in the range of 5-50° of 2θ with a scan step of 0.02° and a counting time of 4 seconds for each step. FIG. 2 is a graph showing X-ray diffraction characterization results of two different nano-sized BEA crystals at silicon to aluminum ratios of 6 (A) and 12.5 (B). XRD confirmed the nano BEA zeolite from crystallinity peaks of the powder, and no impurities were observed in all XRD patterns.

Figure 3:
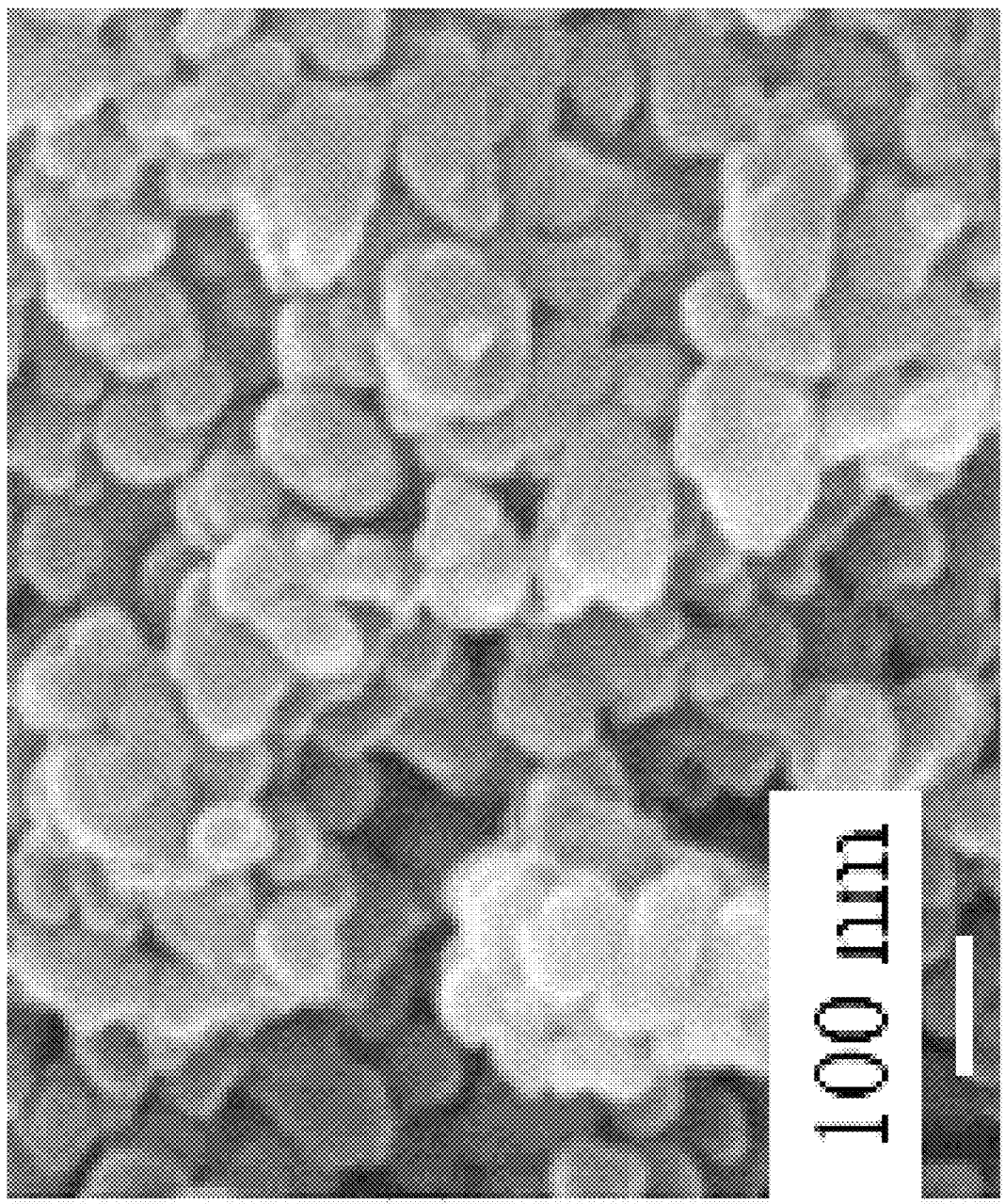
FIG. 3 is a scanning electron microscope (SEM) image of nano-sized BEA zeolite crystal in a size range of about 40 nm to about 80 nm, produced using a zeolite solution with a ratio of silicon to aluminum of 6, and having an emulsion with organic solvent and surfactant present at 30 wt. % compared to the weight of the zeolite solution.
Figure 4:
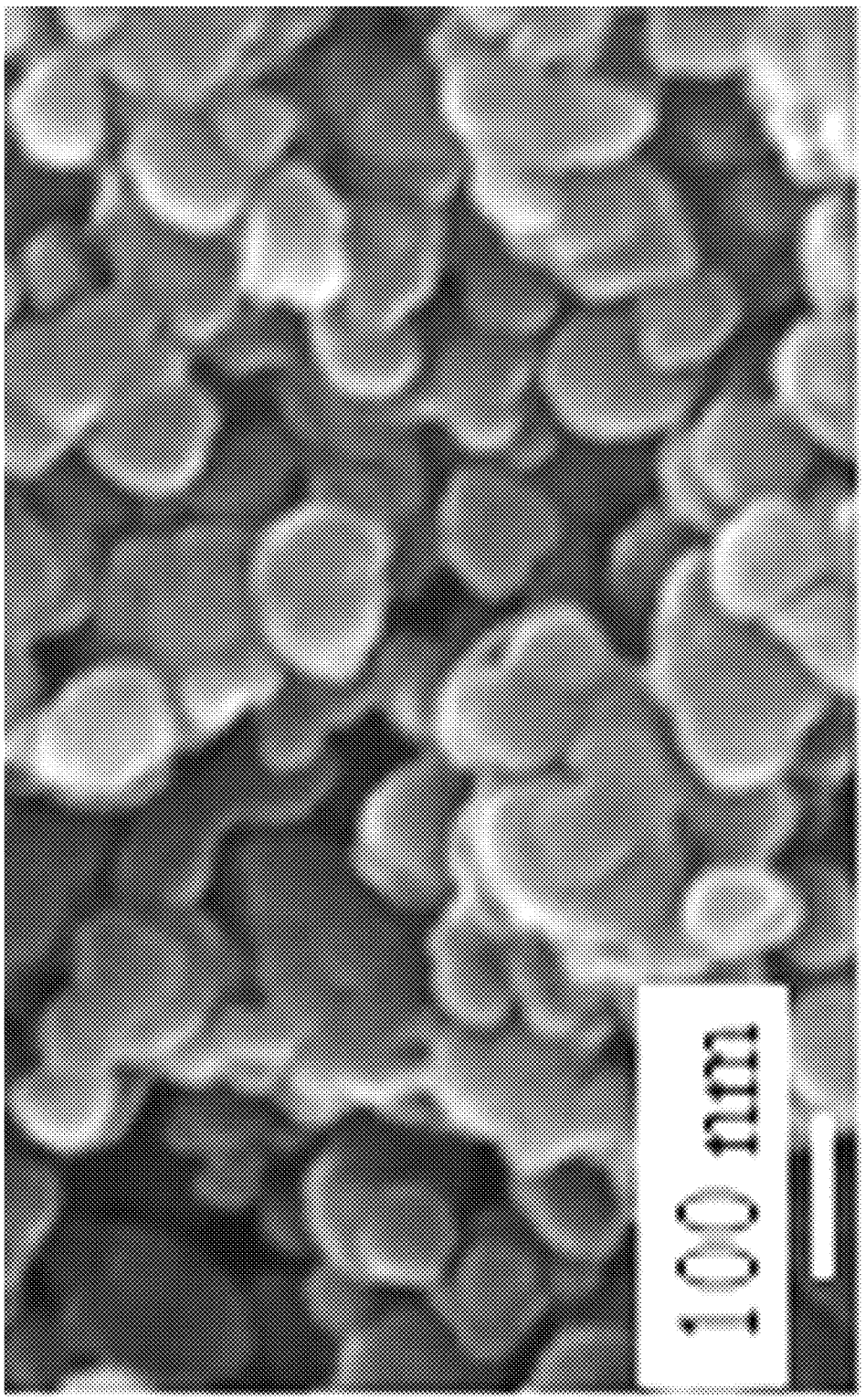
FIG. 4 is an SEM image of nano-sized BEA zeolite crystal in a size range of about 80 nm to about 250 nm, produced using a zeolite solution with a ratio of silicon to aluminum of 12.5, and having an emulsion with organic solvent and surfactant present at 30 wt. % compared to the weight of the zeolite solution.
Figure 5:
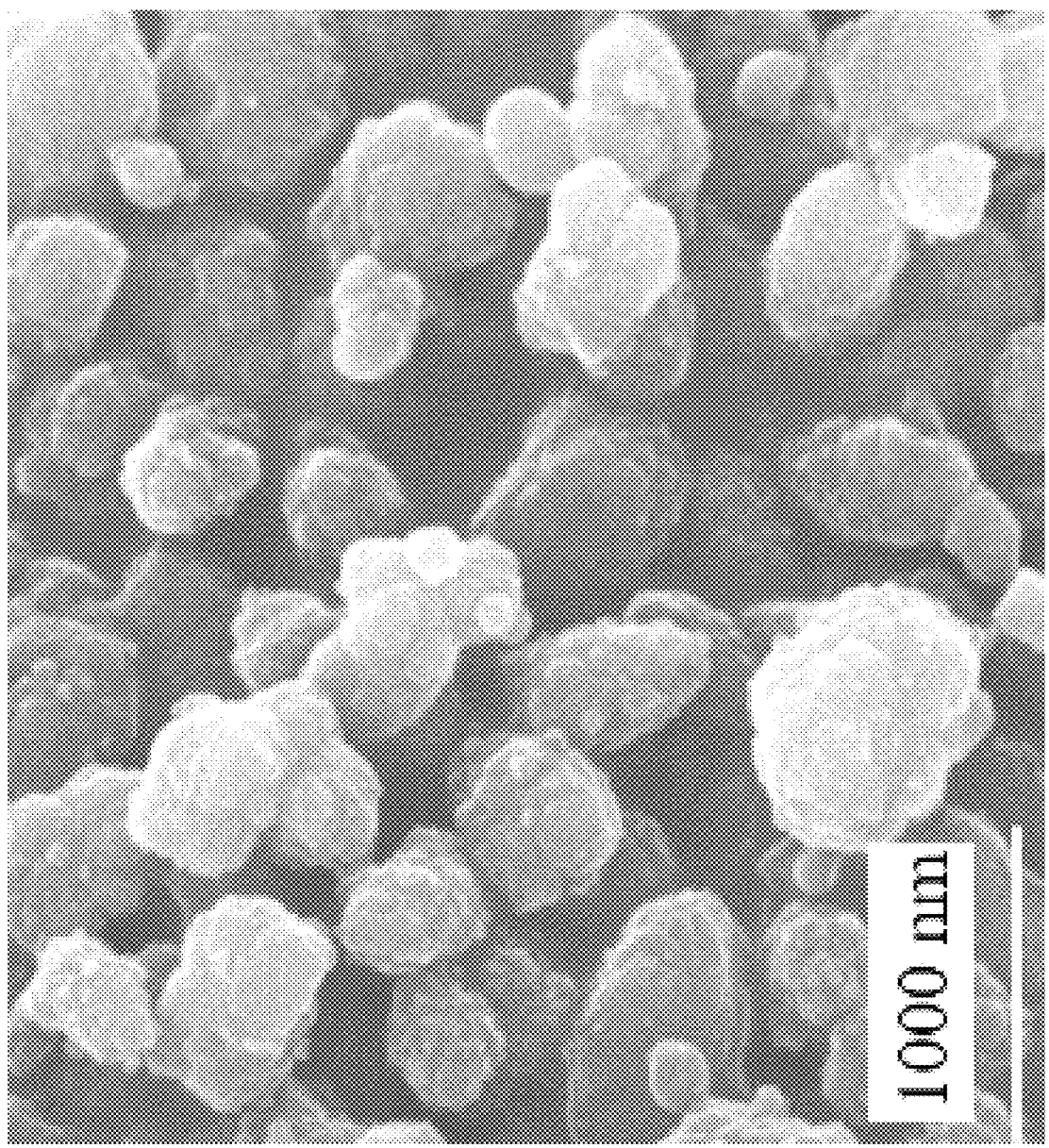
FIG. 5 is an SEM image of nano-sized BEA zeolite crystal in a size range of about 200 nm to about 500 nm, produced using a zeolite solution with a ratio of silicon to aluminum of 12.5, and having an emulsion with organic solvent and surfactant present at 10 wt. % compared to the weight of the zeolite solution.

Scanning electron microscopy (SEM) was also used to characterize the nano-sized BEA zeolite crystals. FIG. 3 is a scanning electron microscope (SEM) image of nano-sized BEA zeolite crystals in a size range of about 40 nm to about 80 nm, produced using a zeolite solution with a ratio of silicon to aluminum of 6, and having an emulsion with organic solvent and surfactant present at 30 wt. % compared to the weight of the zeolite solution. FIG. 4 is an SEM image of nano-sized BEA zeolite crystal in a size range of about 80 nm to about 250 nm, produced using a zeolite solution with a ratio of silicon to aluminum of 12.5, and having an emulsion with organic solvent and surfactant present at 30 wt. % compared to the weight of the zeolite solution. FIG. 5 is an SEM image of nano-sized BEA zeolite crystal in a size range of about 200 nm to about 500 nm, produced using a zeolite solution with a ratio of silicon to aluminum of 12.5, and having an emulsion with organic solvent and surfactant present at 10 wt. % compared to the weight of the zeolite solution.

Synthesis of nano-sized BEA zeolite crystals were performed with example ratios of zeolite solution to an emulsion with organic solvent and surfactant on an about 10-20 kg scale with combined zeolite and emulsion solution weights; however, the systems and processes here can be scaled for continuous and consistent nano-sized BEA zeolite crystal preparation for industrial application.

Systems and methods for nano-sized BEA zeolite crystal production generally include five steps in sequence: preparing a heated emulsion with organic solvent and surfactant; formulating a zeolite and emulsion mixture by dosing a silica-alumina solution with the emulsion comprising an organic solvent and surfactant; carrying out hydrothermal synthesis on the mixture of the emulsion and silica-alumina solution to produce nano-sized BEA zeolite crystals; washing of produced nano-sized BEA zeolite crystals with water; and drying of the nano-sized BEA zeolite crystals.

In some embodiments, the emulsion with organic solvent and surfactant is heated to between about 50° C. and about 75° C., and is injected into a zeolite solution comprising silica colloid and sodium aluminate at between about 0.01 kg/min. to 0.1 kg/min. The solvent can be selected from cyclohexane, hexane, heptane, octane, dimethyl pentane, methyl hexane, methyl cyclohexane, methyl cyclopentane, or combinations of the same. Polyoxyethylene(15)oleyl ether or polyoxyethylene(20)oleyl ether, or a combination thereof can be used as surfactants. The surfactant can be used in a ratio of between about 5 wt. % to about 40 wt. % of the mixture of the organic solvent and surfactant in order to make the emulsion.

While three specific nano-scale size ranges of zeolite are exemplified, one of ordinary skill in the art will understand that by varying the ratio of silicon to aluminum, along with the amount of emulsion used in zeolite solution, other specific and consistent size ranges could be arrived at.

The term "about" when used with respect to a value or range refers to values including plus and minus 5% of the given value or range.

The singular forms "a," "an," and "the" include plural referents, unless the context clearly dictates otherwise.

In the drawings and specification, there have been disclosed embodiments of systems and methods for continuously producing consistently-sized and characterizable nano-sized BEA zeolite crystals, as well as others, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

The invention claimed is:

1. A method for production of consistently-sized BEA zeolite nano-crystals, the method comprising the steps of:
mixing a surfactant and an organic solvent to form a mixture;
heating the mixture, where the step of heating the mixture is carried out at between about 55° C. and about 70° C.;
mixing a zeolite solution, the zeolite solution comprising a silicon-containing compound and an aluminum-containing compound;
heating the zeolite solution;
adding the mixture to the zeolite solution drop-wise over time to create a zeolite emulsion solution mixture;
heating the zeolite emulsion solution mixture; and
precipitating the consistently-sized BEA zeolite nano-crystals, in a range between about 40 nm and about 500 nm.

2. The method according to claim 1, where the step of mixing the zeolite solution further comprises the step of controlling a ratio of the silicon-containing compound to the aluminum-containing compound, and where the step of adding the mixture to the zeolite solution comprises controlling a ratio of the mixture to the zeolite solution to precipitate the consistently-sized BEA zeolite nano-crystals.

3. The method according to claim 1, where the surfactant comprises at least one component selected from the group consisting of: polyoxyethylene(15)oleyl ether, polyoxyethylene(20)oleyl ether, and combinations of the same.

4. The method according to claim 1, where the organic solvent comprises at least one component selected from the group consisting of: cyclohexane, hexane, heptane, octane, dimethyl pentane, methyl hexane, methyl cyclohexane, methyl cylcopentane, and combinations of the same.

5. The method according to claim 1, where the organic solvent is contained in an amount of between about 5 wt. % to about 40 wt. % of the mixture.

6. The method according to claim 1, where the step of mixing a zeolite solution comprises controlling a molar ratio of silicon to aluminum to be between about 5 to about 50.

7. The method according to claim 1, where the silicon-containing compound comprises colloidal silica and the aluminum-containing compound comprises sodium aluminate.

8. The method according to claim 1, where the step of mixing the zeolite solution comprises heating the zeolite solution to between about 15° C. to about 35° C.

9. The method according to claim 1, where the step of adding the mixture to the zeolite solution drop-wise comprises heating to between about 50° C. and about 75° C.

10. The method according to claim 1, where the step of adding the mixture to the zeolite solution drop-wise over time occurs with mixture addition at between about 0.01 kg/min. to about 0.1 kg/min. and where after the step of adding the mixture to the zeolite solution drop-wise over time, the total weight of the emulsion is of between about 5 wt. % and about 40 wt. % of the weight of the zeolite solution.

11. The method according to claim 1, where the step of adding the mixture to the zeolite solution drop-wise over time includes mixing the mixture and the zeolite solution for between about 1 hour to about 3 hours at a stirring speed between about 300 rpm to about 700 rpm and a temperature between about 50° C. to about 75° C.

12. The method according to claim 1, where the step of heating the zeolite emulsion solution mixture is carried out at between about 145° C. and about 155° C. for a period of between about 68 hours and 76 hours.

13. The method according to claim 1, where the step of heating the zeolite emulsion solution mixture includes the step of increasing the temperature from between about 50° C. and about 75° C. to reach about 150° C. at a heating rate of between about 1° C./min. and about 5° C./min.

14. The method according to claim 1, further comprising the step of cooling the zeolite emulsion solution mixture to between about 15° C. to about 50° C. after the step of heating the zeolite emulsion solution mixture.

15. The method according to claim 1, further comprising the step of washing the consistently-sized BEA zeolite nano-crystals.

16. The method according to claim 1, further comprising the step of drying the consistently-sized BEA zeolite nano-crystals.

17. The method according to claim 16, where the step of drying is carried out isothermally for between about 15 to about 20 hours at about 100° C.

18. The method according to claim 1, further comprising the steps of separating aqueous solution, the surfactant, and the organic solvent via heating and recycling the surfactant for use in the step of mixing the surfactant and the organic solvent.

19. The method according to claim 1, further comprising the step of characterizing the size range of the consistently-sized BEA zeolite nano-crystals via X-ray diffraction, scanning electron microscopy, or a combination of the same.

\* \* \* \* \*